(12) United States Patent
Chaudhry et al.

(10) Patent No.: US 7,574,588 B2
(45) Date of Patent: *Aug. 11, 2009

(54) TIME-MULTIPLEXED SPECULATIVE MULTI-THREADING TO SUPPORT SINGLE-THREADED APPLICATIONS

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/359,659

(22) Filed: Feb. 21, 2006

(65) Prior Publication Data

US 2006/0149946 A1    Jul. 6, 2006

Related U.S. Application Data

(63) Continuation of application No. 10/365,313, filed on Feb. 12, 2003, now abandoned, and a continuation-in-part of application No. 09/761,217, filed on Jan. 16, 2001, now Pat. No. 7,051,192.

(60) Provisional application No. 60/368,935, filed on Mar. 29, 2002, provisional application No. 60/208,429, filed on May 31, 2000.

(51) Int. Cl.
    *G06F 9/00* (2006.01)
(52) U.S. Cl. ..................................... 712/235
(58) Field of Classification Search .................. 712/235
    See application file for complete search history.

(56) References Cited

U.S. PATENT DOCUMENTS

| 4,991,080 | A | * | 2/1991 | Emma et al. | ................. 712/206 |
| 5,933,627 | A | * | 8/1999 | Parady | ....................... 712/228 |
| 6,247,027 | B1 | | 6/2001 | Chaudhry et al. | ........... 707/206 |
| 6,353,881 | B1 | * | 3/2002 | Chaudhry et al. | ........... 712/228 |
| 6,430,649 | B1 | * | 8/2002 | Chaudhry et al. | ........... 711/100 |
| 6,463,526 | B1 | | 10/2002 | Chaudhry et al. | ........... 712/228 |
| 6,658,451 | B1 | | 12/2003 | Chaudhry et al. | ........... 718/108 |
| 2003/0005266 | A1 | * | 1/2003 | Akkary et al. | ............... 712/220 |

OTHER PUBLICATIONS

Patterson, David. Hennessy, John. "Computer Architecture: A Quantitative Approach". Morgan Kaufmann Publishers, Inc. Second Edition, 1996. p. 131.*

(Continued)

*Primary Examiner*—Eddie P Chan
*Assistant Examiner*—Robert E Fennema
(74) *Attorney, Agent, or Firm*—Park, Vaughan & Fleming LLP

(57) ABSTRACT

One embodiment of the present invention provides a system that facilitates interleaved execution of a head thread and a speculative thread within a single processor pipeline. The system operates by executing program instructions using the head thread, and by speculatively executing program instructions in advance of the head thread using the speculative thread, wherein the head thread and the speculative thread execute concurrently through time-multiplexed interleaving in the single processor pipeline.

21 Claims, 5 Drawing Sheets

OTHER PUBLICATIONS

Publication: "The Oz Virtual Machine, Records, Transients and Deep Guards," 'Online!, by Michael Mehl, 1999, Universitat Des Saarlandes, Saarbrucken, XP002321958, Retrieved from the Internet: URL:http://www.ps.uni-sb.de/Papers/paper_info.php?label=mehl-thesis>'retrieved on Mar. 21, 2005, pp. 39, 44, 53-57 and 97-107.

Publication: "Computer Architecture a Quantitative Approach", by David A. Patterson and John L. Hennessy, Morgan Kaufmann Publishers, Inc. Second Edition, 1996, p. 125.

* cited by examiner

TIME-MULTIPLEXED SPECULATIVE MULTI-THREADING TO SUPPORT SINGLE-THREADED APPLICATIONS

RELATED APPLICATIONS

This application is a continuation of and hereby claims priority under 35 U.S.C. §120 to U.S. patent application Ser. No. 10/365,313, filed on 12 Feb. 2003 now abandoned, entitled "Time-Multiplexed Speculative Multi-Threading to Support Single-Threaded Applications," by inventors Marc Tremblay and Shailender Chaudhry. Additionally, this application is a continuation-in-part of and hereby claims priority under 35 U.S.C. §120 to U.S. patent application Ser. No. 09/761,217, filed on 16 Jan. 2001 now U.S. Pat. No. 7,051,192, entitled "Facilitating Value Prediction to Support Speculative Program Execution," by inventors Shailender Chaudhry and Marc Tremblay. This application also claims priority under 35 U.S.C. §119 to U.S. Provisional Patent Application No. 60/368,935, filed on 29 Mar. 2002, entitled "Speculative Time-Multiplexed Multi-Threading for Single Threaded Applications," by inventors Marc Tremblay and Shailender Chaudhry and to U.S. Provisional Patent Application No. 60/208,429 filed on May 31, 2000, entitled "Facilitating Value Prediction to Support Speculative Program Execution," by inventors Marc Tremblay and Shailender Chaudhry.

BACKGROUND

1. Field of the Invention

The present invention relates to techniques for improving computer system performance. More specifically, the present invention relates to a method and apparatus that supports interleaved execution of a non-speculative thread and related speculative threads within a single processor pipeline.

2. Related Art

As microprocessor clock speeds continue to increase at an exponential rate, it is becoming progressively harder to design processor pipelines to keep pace with these higher clock speeds, because less time is available at each pipeline stage to perform required computational operations. In order to deal with this problem, some designer have begun to investigate the possibility of statically interleaving the execution of unrelated processor threads in round-robin fashion within a single processor pipeline. In this way, if N unrelated threads are interleaved, instructions for a given thread only appear once for every N consecutive pipeline stages. Hence, the N threads each run at $1/N^{th}$ of the native clock rate of the processor. For example, four threads, each running at three GHz, can collectively run on a 12 GHz processor.

This interleaving technique relaxes latency requirements, which makes it significantly easier to design a high-speed processor pipeline. For example, if four unrelated threads are interleaved, a data cache access (or an addition operation) can take up to four pipeline stages without adversely affecting the performance of a given thread.

Interleaving the execution of multiple threads within a single pipeline has a number of advantages. It saves power and area in comparison to executing the threads in separate pipelines. It also provides a large aggregate throughput for the single pipeline.

However, an application or benchmark that cannot be multi-threaded will not benefit from this interleaving technique. This is a problem because single-threaded performance is important to a large number of customers who buy computer systems. Consequently, benchmarks that customers use to compare computer system performance generally measure single-threaded performance.

Hence, what is needed is a method and an apparatus that provides the advantages of static time-multiplexed execution of multiple threads for a single-threaded application.

SUMMARY

One embodiment of the present invention provides a system that facilitates interleaved execution of a head thread and a speculative thread within a single processor pipeline. The system operates by executing program instructions using the head thread, and by speculatively executing program instructions in advance of the head thread using the speculative thread, wherein the head thread and the speculative thread execute concurrently through time-multiplexed interleaving in the single processor pipeline.

In a variation on this embodiment, the speculative thread includes one or more speculative threads.

In a variation on this embodiment, the system performs a join operation between the head thread and the speculative thread when the head thread reaches a point in the program where the speculative thread began executing.

In a further variation, the head thread operates on primary versions of memory elements, and the speculative thread operates on space-time dimensioned versions of the memory elements (as is done in U.S. Pat. No. 6,353,881, entitled "Supporting Space-Time Dimensional Program Execution by Selectively Versioning Memory Updates" by the same inventors as the instant application). In this variation, performing the join operation involves merging the space-time dimensioned versions of the memory elements into the primary versions of the memory elements, so that updates to the space-time dimensioned versions of the memory elements are incorporated into corresponding primary versions of memory elements.

In a further variation, if the speculative thread performs a read operation to a memory element, the system determines if the space-time dimensioned version of the memory element exists. If so, the system reads the space-time dimensioned version of the memory element. If not, the system reads the primary version of the memory element. The system also updates status information associated with the memory element to indicate the memory element has been read by the speculative thread.

In a further variation, if the speculative thread performs a write operation to a memory element, the system determines if the space-time dimensioned version of the memory element exists. If not, the system creates the space-time dimensioned version of the memory element, and performs the write operation to the space-time dimensioned version of the memory element.

In a further variation, if the head thread performs a read operation to a memory element, the system performs the read operation to the primary version of the memory element.

In a further variation, if the head thread performs a write operation to a memory element, the system performs the write operation to the primary version of the memory element. The system also checks status information associated with the memory element to determine if the memory element has been read by the speculative thread. If so, the system causes the speculative thread to roll back, so that the speculative thread can read a result of the write operation. If not, the system performs the write operation to the space-time dimensioned version of the memory element, if the space-time dimensioned version exists.

In a further variation, the memory elements include objects defined within an object-oriented programming system.

In a variation on this embodiment, the head thread and the speculative thread access separate hardware register files.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
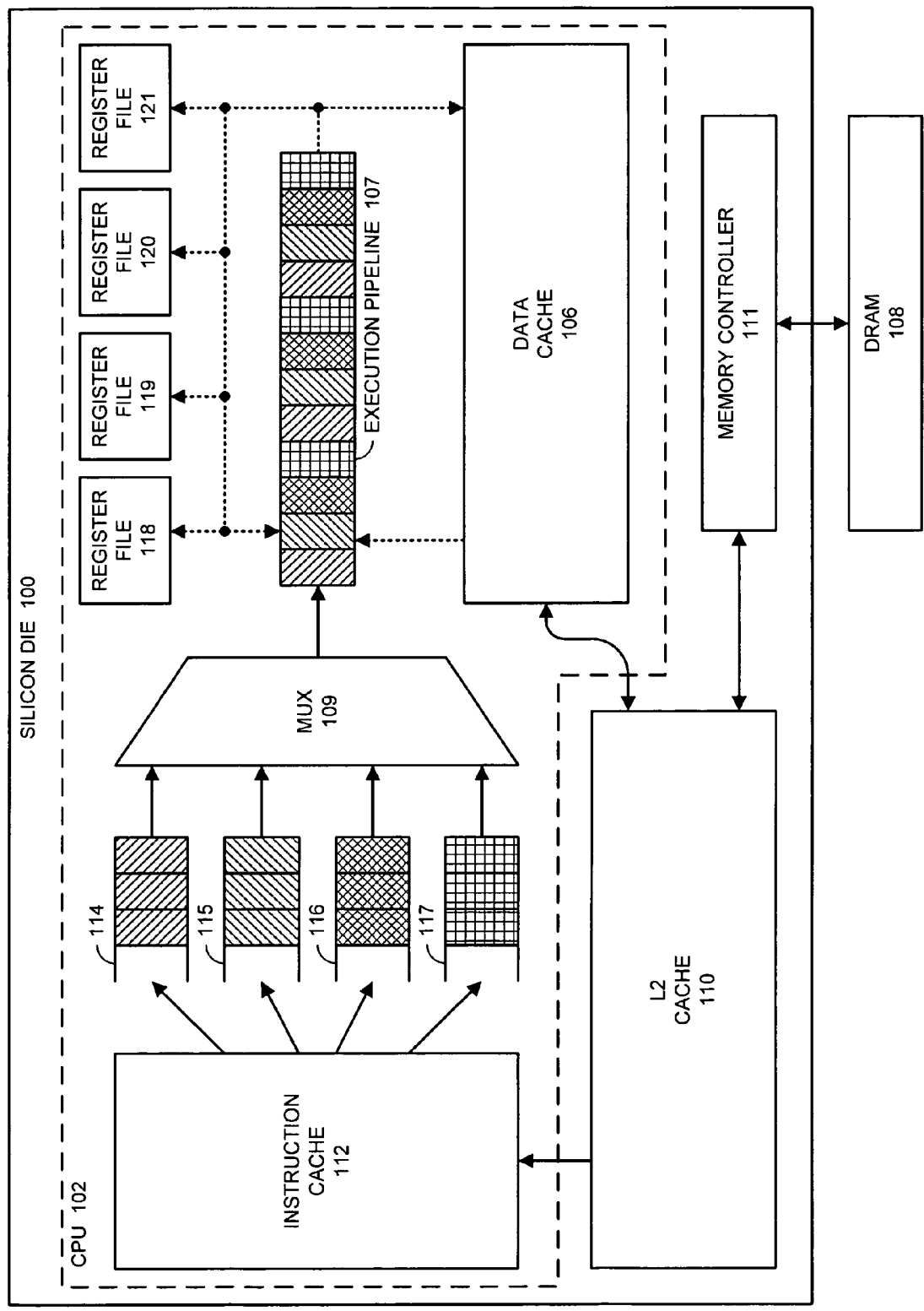
FIG. 1 illustrates a computer system in accordance with an embodiment of the present invention.

FIG. 1 illustrates a computer system in accordance with an embodiment of the present invention. In the embodiment illustrated in FIG. 1, silicon die 100 contains at least one central processing unit (CPU) 102. CPU 102 can generally include any type of computational devices that allow multiple threads to execute concurrently.

CPU 102 includes instruction cache 112, containing instructions to be executed by CPU 102, and data cache 106, containing data to be operated on by CPU 102. In one embodiment of the present invention, data cache 106 is a 64K-byte 4-way set-associative data cache with 64-byte cache lines.

Data cache 106 and instruction cache 112 are coupled to level-two cache (L2) cache, which is coupled to memory controller 111. Memory controller 111 is coupled to dynamic random access memory (DRAM) 108, which is located off chip.

Instruction cache 112 feeds instructions into four separate instruction queues 114-117, which are associated with four separate threads of execution. Instructions from queues 114-117 feed through multiplexer 109, which interleaves instructions from instruction queues 114-117 in round-robin fashion before they feed into execution pipeline 107. As illustrated in FIG. 1, instructions from a given instruction queue occupy every fourth instruction slot in execution pipeline 107. Note that other implementations of processor 102 can possibly interleave instructions from more than four queues, or alternatively, less than four queues.

Because the pipeline slots rotate between different threads, latencies can be relaxed. For example, a load from data cache 106 can take up to four pipeline stages or an arithmetic operation can take up to four pipeline stages, without causes a pipeline stall. In one embodiment of the present invention, this interleaving is "static," which means that each instruction queue is associated with every fourth instruction slot in execution pipeline 107, and this association is does not change dynamically over time.

Instruction queues 114-117 are associated with corresponding register files 118-121, respectively, which contain operands that are manipulated by instructions from instruction queues 114-117. Note that instructions in execution pipeline 107 can cause data to be transferred between data cache 106 and register files 118-119. (In another embodiment of the present invention, register files 118-121 are consolidated into a single large multi-ported register file that is partitioned between the separate threads associated with instruction queues 114-117.)

Note that the present invention generally applies to any computer system that supports concurrent interleaved execution of multiple threads in a single pipeline and is not meant to be limited to the illustrated computing system. For example, the present invention is not meant to be limited to the fixed interleaving round-robin scheduling scheme described above, but can generally be applied to any time-multiplexed scheduling scheme that interleaves instructions from the instruction queues.

Space-Time Dimensional Execution of Methods

Figure 2A:
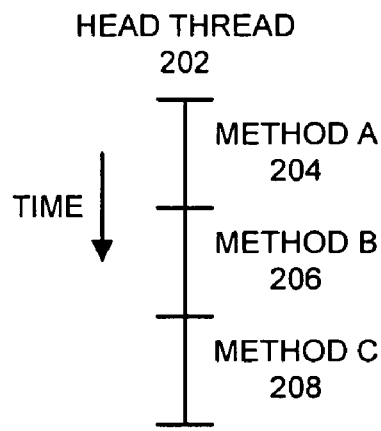
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
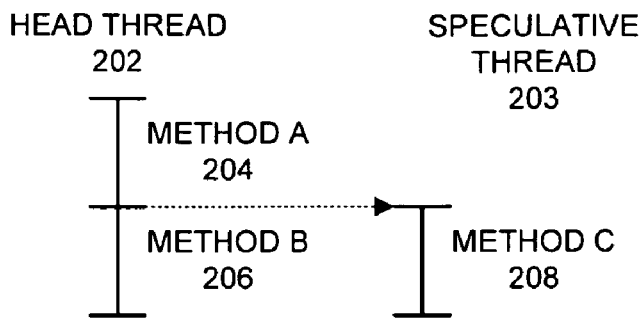
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B 206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
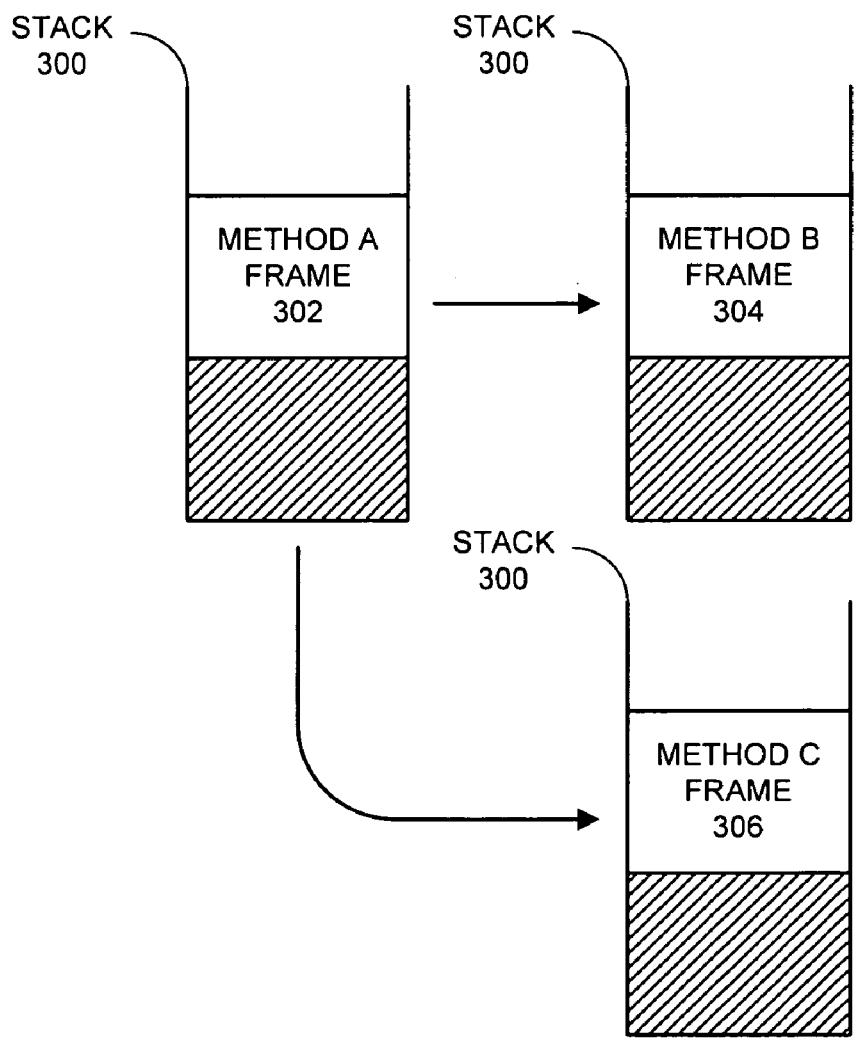
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java bytecode into machine code for the specific computing platform. Alternatively, a Java byte code can be executed directly on a Java bytecode engine running on the specific computing platform.

Fortunately, a Java bytecode contains more syntactic information than conventional machine code. In particular, the Java bytecodes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
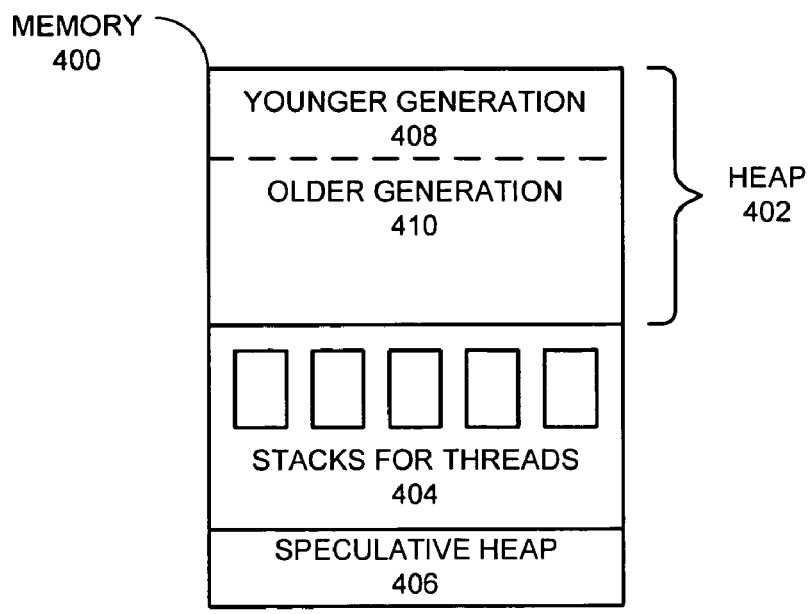
FIG. 4 illustrates how memory is partitioned between stack and heap in accordance with an embodiment of the present invention.
Figure 5:
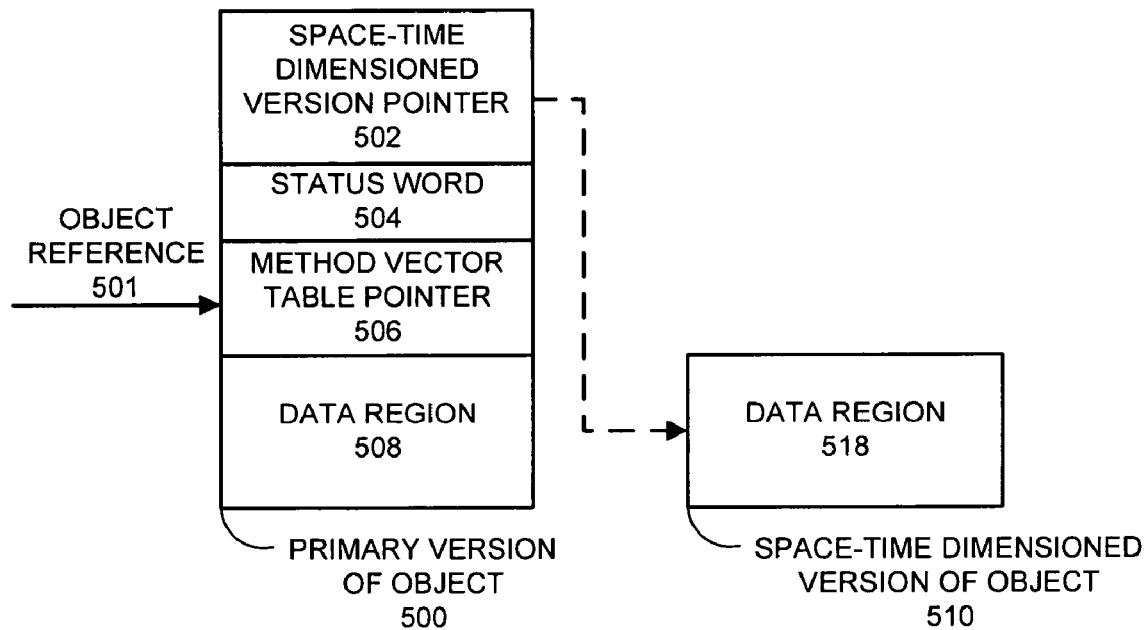
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stacks for threads 404 comprise a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
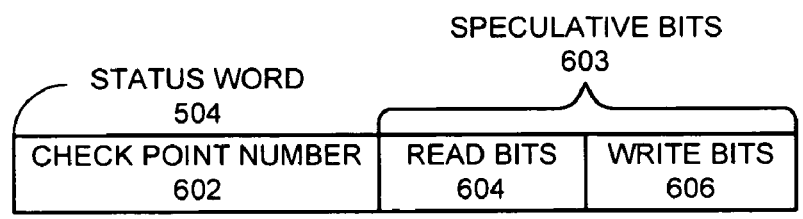
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

Figure 7:
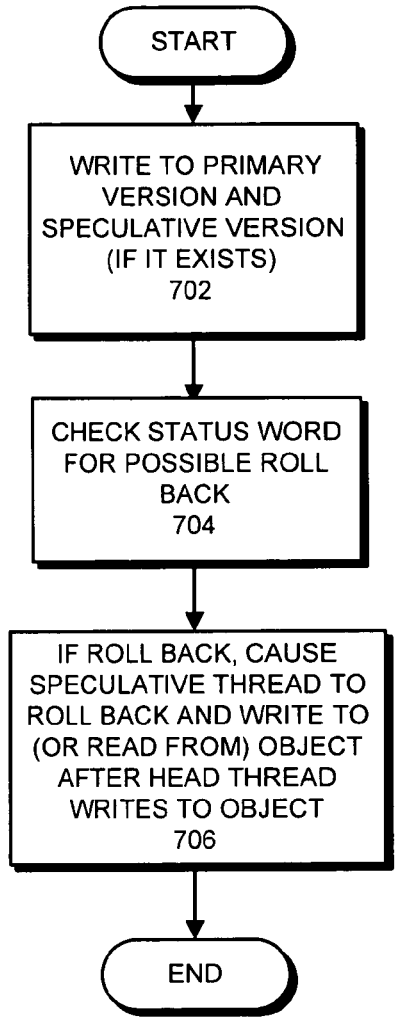
FIG. 7 presents a flow chart illustrating operations involved in performing a write to a memory element by a head thread in accordance with an embodiment of the present invention.

FIG. 7 presents a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

Figure 8:
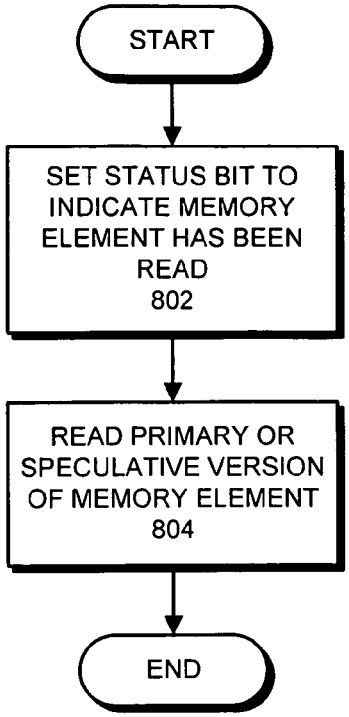
FIG. 8 presents a flow chart illustrating operations involved in performing a read to a memory element by a speculative thread in accordance with an embodiment of the present invention.

FIG. 8 presents a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

Figure 9:
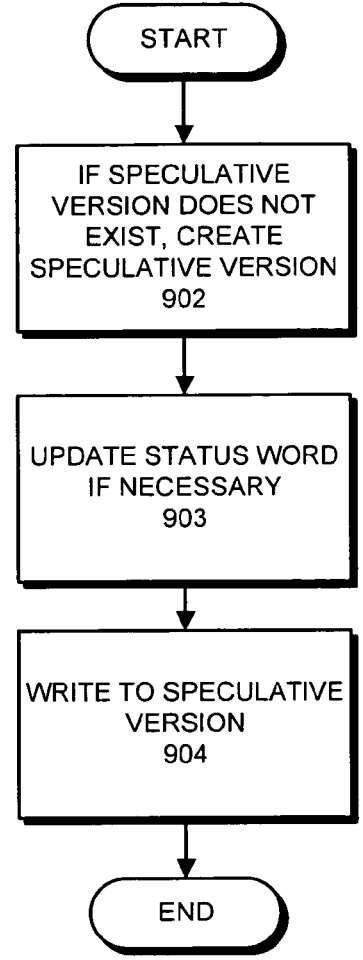
FIG. 9 presents a flow chart illustrating operations involved in performing a write to a memory element by a speculative thread in accordance with an embodiment of the present invention.

FIG. 9 presents a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
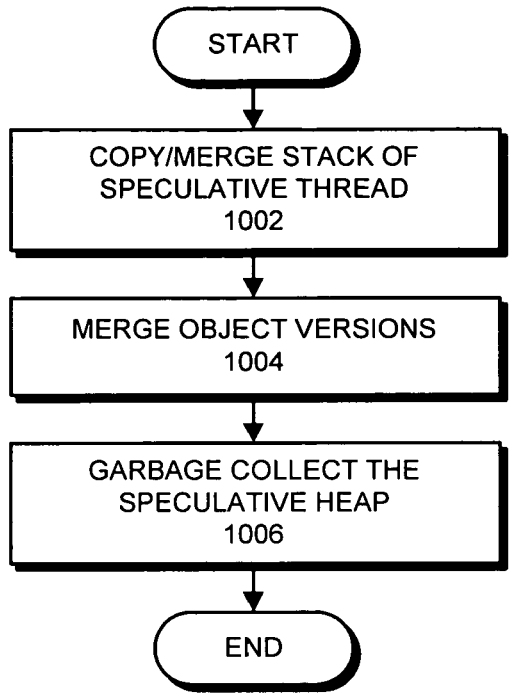
FIG. 10 presents a flow chart illustrating operations involved in performing a join between a head thread and a speculative thread in accordance with an embodiment of the present invention.

FIG. 10 presents a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
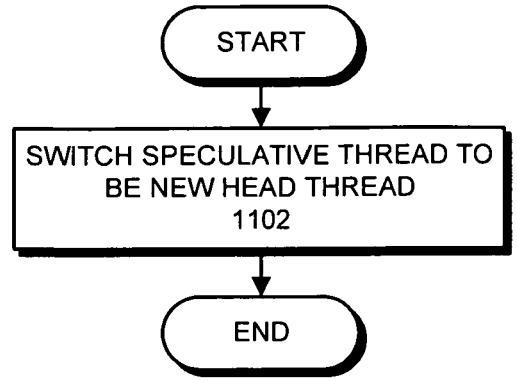
FIG. 11 presents a flow chart illustrating operations involved in performing a join between a head thread and a speculative thread in accordance with another embodiment of the present invention.

FIG. 11 presents a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Extension to Additional Speculative Threads

Although the present invention has been described for the case of a single speculative thread, the present invention can be extended to provide multiple speculative threads operating on multiple space-time dimensioned versions of a data object in parallel.

Interleaved Execution

Figure 12:
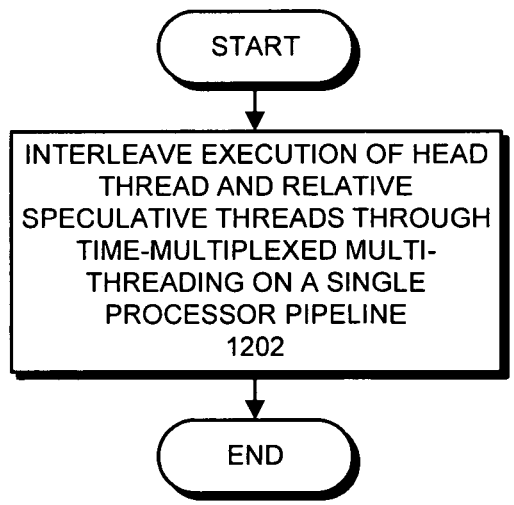
FIG. 12 presents a flow chart illustrating interleaved execution of a head thread and related speculative threads in accordance with an embodiment of the present invention.

FIG. 12 presents a flow chart illustrating interleaved execution of a head thread and related speculative threads in accordance with an embodiment of the present invention. Referring to FIG. 1, head thread 202, speculative thread 203 (and possibly other speculative threads for head thread 202) are executed concurrently on processor 102.

Note that instructions from these threads are time-multiplexed in round-robin fashion to execute in the same instruction pipeline 107. This effectively increases the speed of single-threaded execution on CPU 102, because head thread 202, speculative thread 203, and possibly other speculative threads, are concurrently executing on CPU 102, and are performing work for the same thread of execution.

Also note that the present invention is not limited to the precise form of speculative execution described with this specification. In general, the present invention can be applied any type of speculative execution that makes use of multiple threads.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for interleaving execution within a single processor pipeline of a head thread and a speculative thread, the method comprising:
   executing program instructions using the head thread which operates on primary versions of memory elements;
   speculatively executing program instructions in advance of the head thread using the speculative thread which operates on space-dimensioned versions of the memory elements; and
   if the speculative thread performs a read operation to a memory element:
      determining if the space-time dimensioned version of the memory element exists;
      if the space-time dimensioned version of the memory element exists, reading the space-time dimensioned version of the memory element;
      otherwise, reading the primary version of the memory element; and
      updating status information associated with the memory element to indicate the memory element has been read by the speculative thread;
   upon the head thread reaching a point in the program where the speculative thread began executing, merging the space-time dimensioned versions of the memory elements into the primary versions of the memory elements, so that updates to the space-time dimensioned versions of the memory elements are incorporated into corresponding primary versions of memory elements; and
   wherein instructions from the head thread and instructions from the speculative thread are interleaved in a round-robin fashion and execute concurrently through time-multiplexed interleaving in the single processor pipeline.

2. The method of claim 1, wherein the speculative thread includes one or more speculative threads.

3. The method of claim 1, wherein if the speculative thread performs a write operation to a memory element, the method further comprises:
   determining if the space-time dimensioned version of the memory element exists;
   if the space-time dimensioned version of the memory element does not exist, creating the space-time dimensioned version of the memory element; and
   performing the write operation to the space-time dimensioned version of the memory element.

4. The method of claim 1, wherein if the head thread performs a read operation to a memory element, the method further comprises performing the read operation to the primary version of the memory element.

5. The method of claim 1, wherein if the head thread performs a write operation to a memory element, the method further comprises:
   performing the write operation to the primary version of the memory element;
   checking status information associated with the memory element to determine if the memory element has been read by the speculative thread;
   if the memory element has been read by the speculative thread, causing the speculative thread to roll back so that the speculative thread can read a result of the write operation; and
   if the memory element has not been read by the speculative thread, performing the write operation to the space-time dimensioned version of the memory element if the space-time dimensioned version exists.

6. The method of claim 1, wherein the memory elements include objects defined within an object-oriented programming system.

7. The method of claim 1, wherein the head thread and the speculative thread access separate hardware register files.

8. A computer-readable storage medium storing instructions that when executed by a computer cause the computer to perform a method for interleaving within a single processor pipeline execution of a head thread and a speculative thread, the method comprising:
   executing program instructions using the head thread which operates on primary version of memory elements;
   speculatively executing program instructions in advance of the head thread using the speculative thread which operates on space-dimensioned versions of the memory elements; and
   if the speculative thread performs a read operation to a memory element:
      determining if the space-time dimensioned version of the memory element exists;

if the space-time dimensioned version of the memory element exists, reading the space-time dimensioned version of the memory element;

otherwise, reading the primary version of the memory element; and updating status information associated with the memory element to indicate the memory element has been read by the speculative thread;

upon the head thread reaching a point in the program where the speculative thread began executing, merging the space-time dimensioned versions of the memory elements into the primary versions of the memory elements, so that updates to the space-time dimensioned versions of the memory elements are incorporated into corresponding primary versions of memory elements;

wherein instructions from the head thread and instructions from the speculative thread are interleaved in a round-robin fashion and execute concurrently through time-multiplexed interleaving in the single processor pipeline.

9. The computer-readable storage medium of claim 8, wherein the speculative thread includes one or more speculative threads.

10. The computer-readable storage medium of claim 8, wherein if the speculative thread performs a write operation to a memory element, the method further comprises:

determining if the space-time dimensioned version of the memory element exists;

if the space-time dimensioned version of the memory element does not exist, creating the space-time dimensioned version of the memory element; and performing the write operation to the space-time dimensioned version of the memory element.

11. The computer-readable storage medium of claim 8, wherein if the head thread performs a read operation to a memory element, the method further comprises performing the read operation to the primary version of the memory element.

12. The computer-readable storage medium of claim 8, wherein if the head thread performs a write operation to a memory element, the method further comprises:

performing the write operation to the primary version of the memory element;

checking status information associated with the memory element to determine if the memory element has been read by the speculative thread;

if the memory element has been read by the speculative thread, causing the speculative thread to roll back so that the speculative thread can read a result of the write operation; and if the memory element has not been read by the speculative thread, performing the write operation to the space-time dimensioned version of the memory element if the space-time dimensioned version exists.

13. The computer-readable storage medium of claim 8, wherein the memory elements include objects defined within an object-oriented programming system.

14. The computer-readable storage medium of claim 8, wherein the head thread and the speculative thread access separate hardware register files.

15. An apparatus that supports interleaving execution of a head thread and a speculative thread within a single processor pipeline, the apparatus comprising:

a processor;

a processor pipeline within the processor;

an execution mechanism within the processor that is configured to, execute program instructions using the head thread which operates on primary versions of memory elements;

speculatively execute program instructions in advance of the head thread using the speculative thread which executes on space-time dimensioned versions of the memory elements; and if the speculative thread performs a read operation to a memory element:

determine if the space-time dimensioned version of the memory element exists;

if the space-time dimensioned version of the memory element exists, read the space-time dimensioned version of the memory element;

otherwise, read the primary version of the memory element; and to update status information associated with the memory element to indicate the memory element has been read by the speculative thread; and a join mechanism that is configured to merge the space-time dimensioned versions of the memory elements into the primary versions of the memory elements when the head thread reaches a point in the program where the speculative thread began executing, so that updates to the space-time dimensioned versions of the memory elements are incorporated into corresponding primary versions of memory elements;

wherein instructions from the head thread and instructions from the speculative thread are interleaved in a round-robin fashion, and wherein the execution mechanism is configured to concurrently execute the head thread and the speculative thread through time-multiplexed interleaving in the processor pipeline.

16. The apparatus of claim 15, wherein the speculative thread includes one or more speculative threads.

17. The apparatus of claim 15, wherein if the speculative thread performs a write operation to a memory element, the execution mechanism is configured to:

determine if the space-time dimensioned version of the memory element exists;

if the space-time dimensioned version of the memory element does not exist, to create the space-time dimensioned version of the memory element; and to perform the write operation to the space-time dimensioned version of the memory element.

18. The apparatus of claim 15, wherein if the head thread performs a read operation to a memory element, the execution mechanism is configured to perform the read operation to the primary version of the memory element.

19. The apparatus of claim 15, wherein if the head thread performs a write operation to a memory element, the execution mechanism is configured to:

perform the write operation to the primary version of the memory element;

check status information associated with the memory element to determine if the memory element has been read by the speculative thread;

if the memory element has been read by the speculative thread, to cause the speculative thread to roll back so that the speculative thread can read a result of the write operation; and if the memory element has not been read by the speculative thread, to perform the write operation to the space-time dimensioned version of the memory element if the space-time dimensioned version exists.

20. The apparatus of claim 15, wherein the memory elements include objects defined within an object-oriented programming system.

21. The apparatus of claim 15, wherein the head thread and the speculative thread access separate hardware register files.

* * * * *